C. G. SWENSON.
METHOD OF SECURING SOCKETS TO BAILS.
APPLICATION FILED JAN. 6, 1912.

1,035,655.

Patented Aug. 13, 191.

Inventor
Carl G. Swenson,

Witnesses

By Howard A. Coombs
his Attorney

UNITED STATES PATENT OFFICE.

G. SWENSON, OF WORCESTER, MASSACHUSETTS.

METHOD OF SECURING SOCKETS TO BAILS.

1,035,655.

Specification of Letters Patent.

Patented Aug. 13, 1912.

Application filed January 6, 1912. Serial No. 669,723.

*To all whom it may concern:*

Be it known that I, CARL G. SWENSON, a citizen of the United States, residing at Worcester, in the county of Worcester and State of Massachusetts, have invented new and useful Improvements in Methods of Securing Sockets to Bails, of which the following is a specification.

My invention relates to the manner of securing together two metal parts, one of which is a solid cylindrical rod and the other a tubular piece having a bore of reduced diameter at one end, the former passing through the latter transversely, or at right angles to its axis.

As an example of a joint made by my improved method, I have selected for illustration the joint between the tubular handle-socket of a sweeper or vacuum cleaner and the bail member to which said socket is secured.

Figure 1:
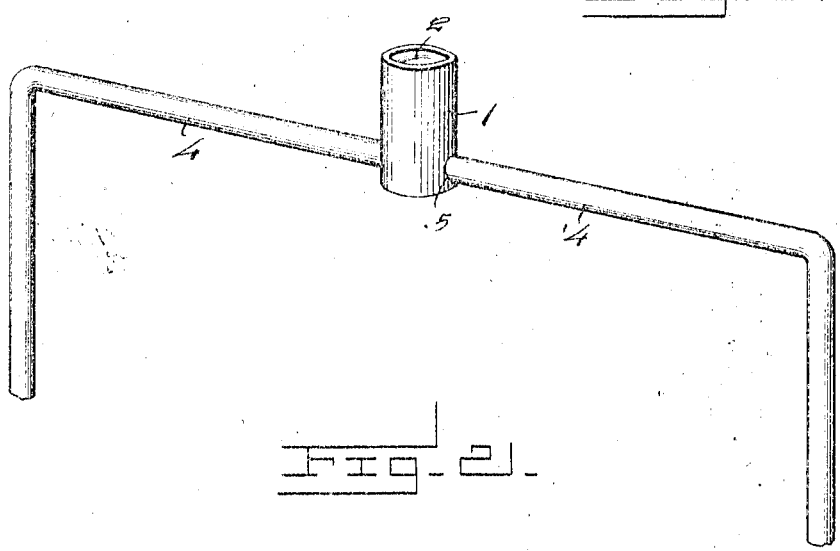
Figure 2:
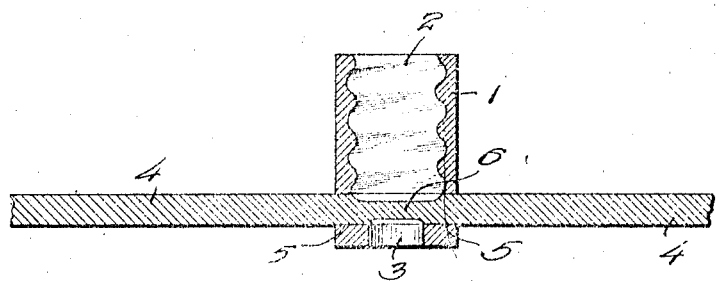
Figure 3:
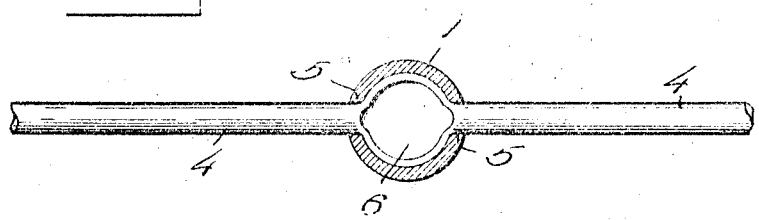

In the accompanying drawing,—Figure 1 is a perspective view of the bail and socket connected, Fig. 2 is a vertical section through the same, and Fig. 3 is a cross-section of the socket taken just above the plane of the bail.

The socket is shown at 1, the same being a sleeve, threaded internally at 2 for the reception of the handle for the major portion of its length, and having a bore 3 of smaller diameter for the remaining portion.

The bail is shown at 4, and is passed through alined openings 5, formed in the wall of the socket, at the bottom of the threaded portion.

To secure the socket and bail rigidly together, that portion of the latter, lying within the former between said openings 5, is subjected to the action of swaging dies, which flatten and expand it, as shown at 6, causing it to fill the bore of the socket, whereby the latter is rigidly secured on the bail.

Of course, if desired, the joint may be welded, brazed or soldered in addition.

Having thus described my invention, what I claim is:—

The method of joining a tubular member, having a bore of reduced diameter at one end, and a solid rod, at right angles to each other, which consists in drilling alined holes through the walls of the tubular member, the axis of said holes lying approximately at the junction of the larger and smaller bores in said member, passing the rod through said holes, and finally flattening and expanding that portion of the rod lying within the tubular member.

In testimony whereof I have hereunto set my hand in presence of two subscribing witnesses.

CARL G. SWENSON.

Witnesses:
LOTTIE L. CHAMBERLAIN,
GRACE M. PIERCE.